(12) United States Patent
Whitney

(10) Patent No.: US 7,611,554 B2
(45) Date of Patent: Nov. 3, 2009

(54) COLLECTOR BAG FOR VACUUMED SOIL AND LAWN DEBRIS

(75) Inventor: James Carpenter Whitney, Norwalk, CT (US)

(73) Assignee: Woodland Products, Inc., West Haven, CT (US)

( * ) Notice: Subject to any disclaimer, the term of this patent is extended or adjusted under 35 U.S.C. 154(b) by 511 days.

(21) Appl. No.: 11/209,502

(22) Filed: Aug. 23, 2005

(65) Prior Publication Data

US 2007/0051079 A1   Mar. 8, 2007

(51) Int. Cl.
   *B01D 46/00*   (2006.01)
(52) U.S. Cl. .............................. 55/361; 56/202; 55/375
(58) Field of Classification Search .................. 55/361, 55/375; 56/202
   See application file for complete search history.

(56) References Cited

U.S. PATENT DOCUMENTS

| 3,971,198 | A | 7/1976 | Lane |
| 4,444,002 | A | 4/1984 | Heismann et al. ............. 56/202 |
| 4,637,202 | A | 1/1987 | Lamusga ..................... 56/16.6 |
| 5,457,946 | A * | 10/1995 | Deitrick ...................... 56/16.6 |
| 5,685,454 | A * | 11/1997 | Bonerb .......................... 222/1 |
| 6,070,288 | A * | 6/2000 | Luyckx et al. ................ 15/323 |
| 6,178,592 | B1 * | 1/2001 | Whitney ....................... 15/347 |
| 6,308,375 | B1 * | 10/2001 | Whitney ....................... 15/347 |

OTHER PUBLICATIONS

EP Search Report dated Dec. 15, 2006 from corresponding GB Appln. No. 0616320.8.

* cited by examiner

*Primary Examiner*—Robert J Hill, Jr.
*Assistant Examiner*—Karla Hawkins
(74) *Attorney, Agent, or Firm*—Ohlandt, Greeley, Ruggiero & Perle, LLP

(57) ABSTRACT

The collector bag is provided that includes a fabric formed to define an internal volume, a plurality of sewn loops for disposal about an outer periphery of the collector frame, and a gather of fabric at each of the plurality of sewn loops for disposal about an inner circumference of the collector frame. The plurality of sewn loops are secured to the gather so that the internal volume of the collector bag, when disposed on the collector frame, is at least about 90 percent of a maximum volume of the collector frame.

19 Claims, 3 Drawing Sheets

COLLECTOR BAG FOR VACUUMED SOIL AND LAWN DEBRIS

BACKGROUND OF THE INVENTION

1. Field of the Invention

The present disclosure is related to a collector bag for vacuumed soil and lawn debris. More particularly, the present disclosure is related to a collector bag having its internal volume maximized and/or having a replaceable vent screen.

2. Description of Related Art

Vacuum collection, mulching, and transportation devices for material such as soil and lawn debris such as, but not limited to, leaves, sticks, rocks, lawn trimmings, and the like (hereinafter "debris") have been developed. In use, the devices collect the debris in a collector unit or bagger (hereinafter "collector unit").

The amount of debris that can be collected by the collector unit is limited by the internal volume of the collector unit. Once full, the collection of debris must be halted so that the collector unit can be emptied.

Many collector units have hard or rigid (hereinafter "rigid") walls. The rigid wall collector units are typically made of steel panels or heavy gauge polymers, which increase the weight of the collector unit. Thus, movement of the rigid wall collector units by both a lawn tractor or by hand during storage can be difficult. Further, the rigid wall collector units typically require a large storage space, as the rigid walls remain in place after use. In order to increase the internal volume of such rigid collector units, a corresponding increase in storage space is required.

Soft-walled collector units have recently been proposed by the assignee of the present application. Such soft-walled collector units have effectively overcome many of the deficiencies of the prior rigid wall collector units. These soft-walled collector units are lightweight, durable, and can easily be folded for storage. However, the amount of debris that can be collected by these soft-walled collector units is still limited by the internal volume of the collector unit.

Accordingly, there is a continuing desire for soft-walled collector units having a maximum internal volume.

BRIEF SUMMARY OF THE INVENTION

It is an object of the present disclosure to provide a collector bag having a maximized internal volume.

It is another object to provide a collector bag having a removable vent screen.

It is yet another object of the present disclosure to provide a collector bag having a maximized internal volume and a removable vent screen.

In one embodiment, a collector bag for use with a collector frame is provided. The collector bag includes a fabric formed to define an internal volume, a plurality of sewn loops for disposal about an outer periphery of the collector frame, and a gather of fabric at each of the plurality of sewn loops for disposal about an inner circumference of the collector frame. The plurality of sewn loops are secured to the gather so that the internal volume of the collector bag, when disposed on the collector frame, is at least about 90 percent of a maximum volume of the collector frame.

In another embodiment, the collector bag includes a fabric formed to define an internal volume, a plurality of sewn loops for disposal about an outer periphery of the collector frame, and a gather of fabric at each of the plurality of sewn loops for disposal about an inner circumference of the collector frame. The gather of fabric has a length that is at least equal to a length of the sewn loop.

In another embodiment, the collector bag includes a fabric formed to define an internal volume and a vent screen releasably secured to the fabric. The vent screen includes a mesh filter.

The above-described and other features and advantages of the present disclosure will be appreciated and understood by those skilled in the art from the following detailed description and drawings.

DETAILED DESCRIPTION OF THE INVENTION

Figure 1:
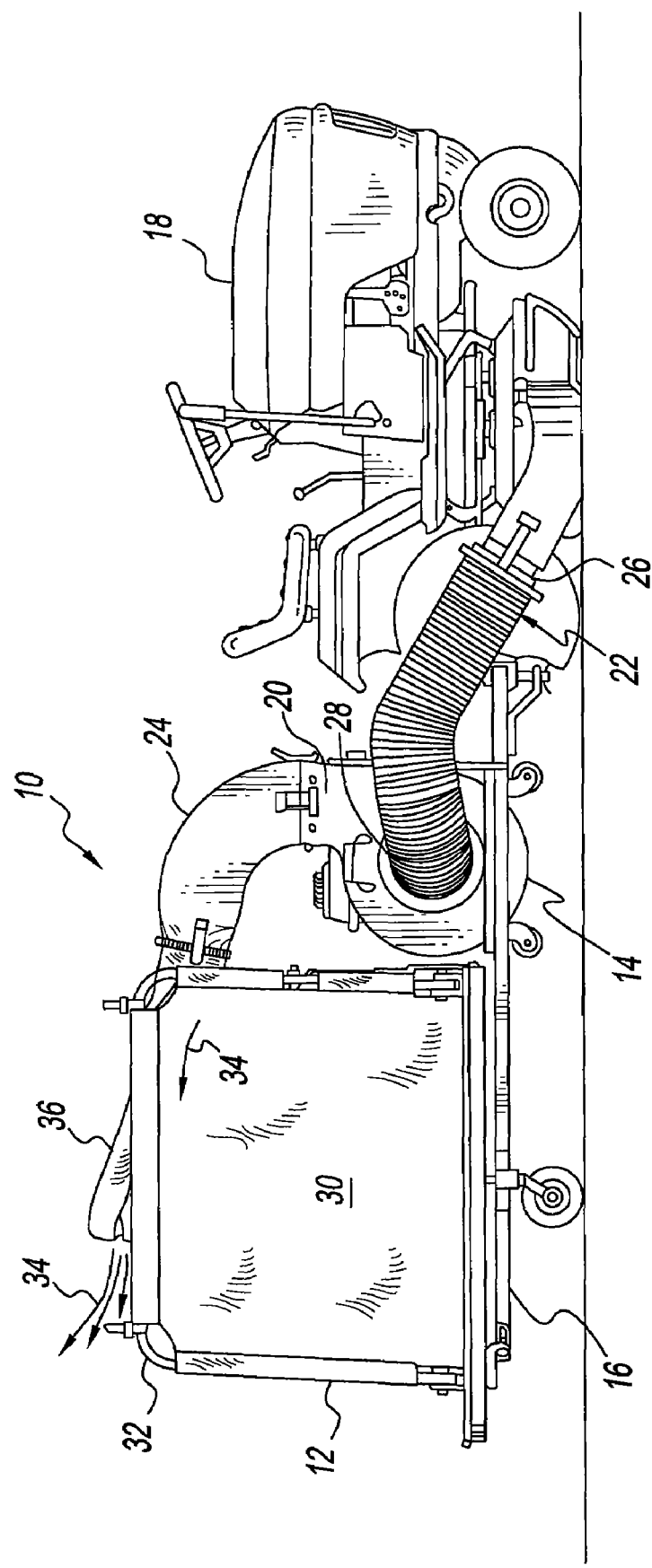
FIG. 1 is a side view of a prior art vacuum device.
Figure 2:
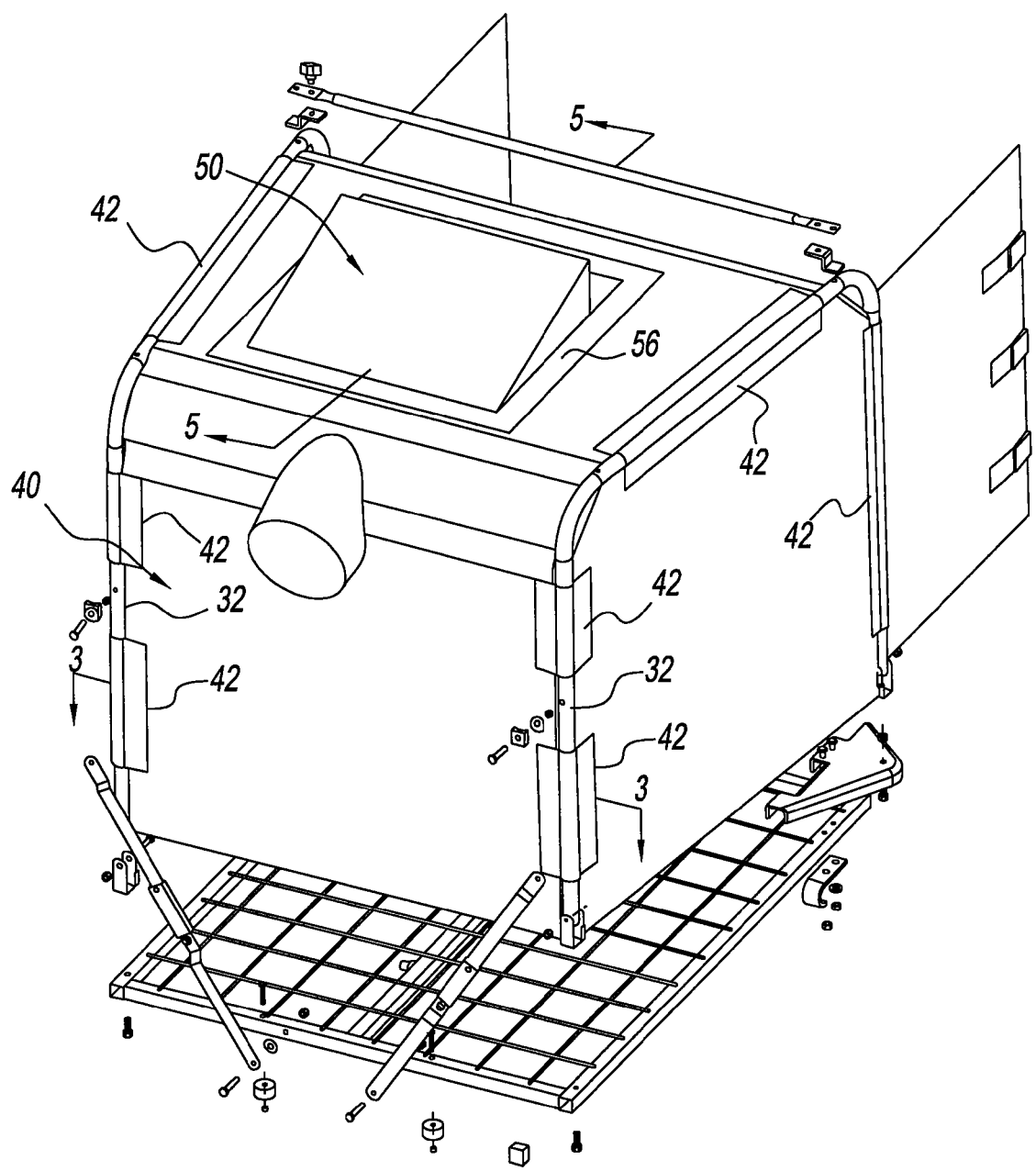
FIG. 2 is a partially exploded top front perspective view of an exemplary embodiment of a soft-wall collector unit according to the present disclosure.

Referring to the drawings and in particular to FIGS. 1 and 2, a prior art vacuum device 10 for use in the collection, mulching, and transportation of debris is shown. Vacuum device 10 can be any known device such as that as shown and described in commonly owned and assigned U.S. Pat. Nos. 6,029,312 and 6,178,592, the contents of which are incorporated by reference herein.

Generally, vacuum device 10 includes a debris collector unit 12 and a vacuum generator 14. Collector unit 12 and vacuum generator 14 are mounted on a chassis 16, which is securable to a typical lawn tractor 18. Vacuum generator 14 includes a power plant, such as a gas or diesel engine, for rotating an impeller (not shown) in a housing 20. The rotation of the impeller generates a vacuum in housing 20 and allows the impeller to mulch debris passing through the housing.

Vacuum device 10 includes an intake conduit 22 and an exhaust conduit 24. Intake conduit 22 has a first end 26 and a second end 28. First end 26 is releasably secured to the mower deck of tractor 18, while second end 28 is releasably secured to housing 20. In this manner, intake conduit 22 places vacuum generator 14 in fluid communication with the mower deck of tractor 18. Exhaust conduit 24 is in fluid communication with collector unit 12 so that debris drawn-in and mulched by vacuum generator 14 is collected in the collector unit.

Collector unit 12 includes a collector bag 30 made of a substantially of non-breathable supported by a collector frame 32. Exhaust conduit 24 forces the debris entrained in a stream of pressurized air 34 into collector unit 12. Collector unit 12 includes a vent screen 36 for venting pressurized air 34 rearwardly, while maintaining the debris in the collector unit.

Referring now to FIG. 2, collector unit 12 is illustrated in use with an exemplary embodiment of a collector bag 40 according to the present disclosure. Collector bag 40 is supported on collector frame 32 by a plurality of sewn loops 42. Advantageously, collector bag 40 has an internal volume that is maximized as compared to the maximum volume of collector unit 12.

As used herein, the maximum volume of collector unit 12 is determined from a line drawn about the outer perimeter of the individual support tubes of collector frame 32. Sewn loops 42 are configured to minimize the distance between collector bag 40 and the individual tubes of collector frame 32 so that the internal volume of the collector bag is substantially equal to the maximum volume of collector unit 12. Preferably, collector bag 40, before use, has an internal volume of at least about 90 percent of the maximum volume of collector unit 12, more preferably at least about 95 percent, with about 99 percent being most preferred.

Figure 3:
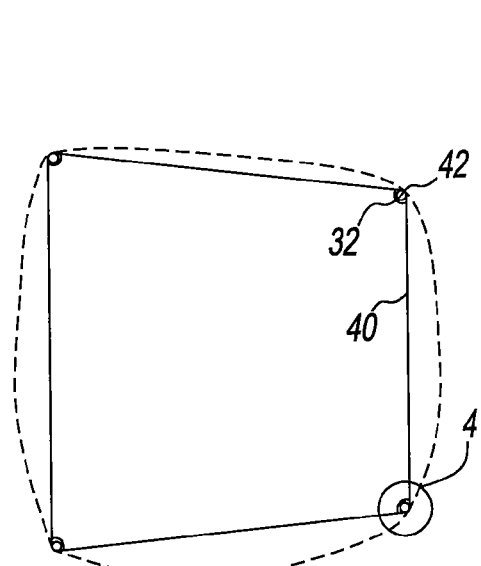
FIG. 3 is a sectional view of the collector unit of FIG. 2, taken along lines 3-3.
Figure 4:
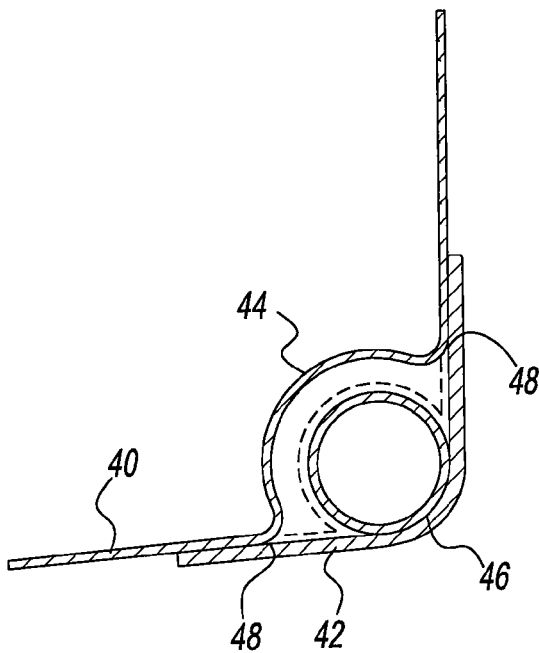
FIG. 4 is a view of circle 4 of FIG. 3.

During use, the collector bag 40 expands as a result of the stream of pressurized air 34 into collector unit 12 as illustrated in phantom in FIGS. 3 and 4. Preferably, collector bag 40, during use, has an internal volume of at least about 115 percent of the maximum volume of collector unit 12, more preferably at least about 120 percent, with about 125 percent being most preferred.

The interconnection of collector bag 40, collector frame 32, and sewn loops 42 is best described with reference to FIGS. 3 and 4. Collector bag 40 includes a gather 44 of fabric at each sewn loop 42. Sewn loops 42 are disposed about an outer periphery 46 of collector frame 32, while gather 44 is disposed about an inner circumference of the collector frame.

Sewn loops 42 are joined to gather 44 at a point 48. Gather 44 has a length that is at least equal to the length of sewn loops 42. More preferably, gather 44 has a length that is longer than the length of sewn loops 42. Again, during use collector bag 40 expands due to pressurized air 34. Advantageously, the increased length of gather 44 allows collector bag 40 to expand into contact with the individual tubes of collector frame 32. In this manner, collector bag 40, before use, has an internal volume that is about equal to the maximum volume of collector unit 12 minus the volume of the individual tubes of collector frame 32.

It should be recognized that collector bag 40 of the present disclosure is described with reference in use with a collector unit 12 having a generally isosceles trapezoidal cross section as shown in FIG. 3. In this embodiment, collector bag 40 would also have a generally trapezoidal cross section. Of course, it is contemplated by the present disclosure for collector bag 40 to find use with collector units having any desired cross sectional shape such as, but not limited to, a rectangular cross sectional shape.

Figure 5:
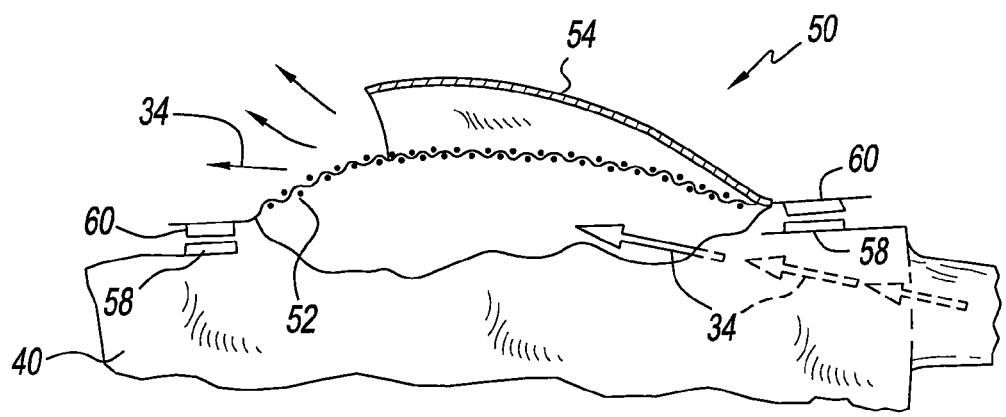
FIG. 5 is a sectional view of a replaceable vent screen according to the present disclosure.

In other embodiments of the present disclosure, collector bag 40 can include a replaceable vent screen 50 shown in FIGS. 2 and 5. For purposes of clarity, debris entrained in pressurized air 34 within collector bag 40 is omitted.

Vent screen 50 includes a mesh filter 52, preferably, a deflector 54. Pressurized air 34 and any debris entrained therein are forced into collector bag 40 and impinge on mesh filter 52. Mesh filter 52 removes the debris from pressurized air 34, while allowing the pressurized air to exit collector bag 40.

It has been determined that the performance of collector unit 12 can vary depending on the material being collected. For example during the spring and summer, collector unit 12 is typically used to collect leaves, sticks, and other large debris. However, during the fall, collector unit 12 is typically used to collect trimmed grass and other small or fine debris. When mesh filter 52 is clogged or full of debris, pressurized air 34 is unable to exit collector bag 40, which can undesirably increase the back pressure in the collector back and resist delivery and deposit of more debris in the bag. Mesh filter 52 with a mesh or grid size appropriate for the larger debris unfortunately allows smaller debris to pass through vent screen 50. Conversely, mesh filter 52 with a mesh or grid size appropriate for the smaller debris can become partially blocked with larger debris, increasing the back-pressure in collector bag 40.

Advantageously, vent screen 50 is selectively removable from collector bag 40. Thus, removable vent screen 50 allows the user to install mesh filter 52 having a mesh size that best matches the debris being collected. In addition, replaceable vent screen 50 allows the user to replace mesh filters 52 without need to replace the entire collector bag 40.

Collector bag 40 and vent screen 50 each include one or more cooperating connectors 56 for releasably securing the vent screen to the collector bag. Connector 56 can include a male portion 58 of hook-and-loop type connecting material on collector bag 40 and a female portion 60 of hook-and-loop type connecting material on vent screen 50. Hook-and-loop type connecting material is readily available under the tradename VELCRO. Of course, it is contemplated by the present disclosure for connector 56 to include a zipper, a set of snaps, VELCRO, any other releasable securing device, and any combinations thereof.

Collector bag 40 having sewn loops 42 and replaceable vent screen 50 according to the present disclosure allow for the use of collector unit 12 in an uninterrupted manner for longer than previously possible. For example, collector bag 40 has a larger internal volume than previously available in identically sized collector frames 32, allowing more debris to be collected before needing to stop use to empty the collector bag. Further, replaceable vent screen 50 allows the user to install a mesh filter 52 having a mesh size that best matches the debris being collected, which prevents undesired reduction in the airflow and, thus, increased efficiency.

As collector bag 40 fits the collector frame 32 of existing collector unit 12, the improved collector bag of the present disclosure can be provided as an upgrade for all existing collector units. Here, collector bag 40 can be provided as part of a replacement kit that includes the collector bag and a plurality of vent screen 50 having varying sized mesh filters 52.

It should also be noted that the terms "first," "second," "third," "upper," "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the present disclosure.

The invention claimed is:

1. A collector unit comprising:
    a fabric collector bag formed to define an internal volume;
    a collector frame;
    a plurality of sewn loops being disposed about an outer periphery of said collector frame; and
    a gather of fabric of said fabric collector bag at each of said plurality of sewn loops, said gather of fabric being disposed about an inner circumference of said collector frame, each of said plurality of sewn loops being secured to said gather so that said internal volume of said fabric collector bag before use is at least about 90 percent of a maximum volume of said collector frame and so that said internal volume is equal to at least about 115 percent of said maximum volume of said collector frame during use of said fabric collector bag.

2. The collector unit of claim 1, wherein said fabric collector bag and said collector frame have a substantially isosceles trapezoidal cross sectional shape.

3. The collector unit of claim 1, wherein said fabric collector bag and said collector frame have a substantially rectangular cross sectional shape.

4. The collector unit of claim 1, further comprising a vent screen releasably secured to said fabric collector bag.

5. A collector unit comprising:
   a fabric collector bag formed to define an internal volume;
   a collector frame;
   a plurality of sewn loops being disposed about an outer periphery of said collector frame; and
   a gather of fabric of said fabric collector bag at each of said plurality of sewn loops, said gather of fabric being disposed about an inner circumference of said collector frame, said gather of fabric having a length that is at least equal to a length of each of said plurality of sewn loops, wherein said internal volume is equal to at least about 115 percent of a maximum volume of said collector frame during use of said fabric collector bag.

6. The collector unit of claim 5, wherein said gather of fabric is in contact with said collector frame during use of said fabric collector bag.

7. The collector unit of claim 6, wherein said internal volume is about equal to a maximum volume of said collector frame minus the volume of individual tubes of said collector frame.

8. The collector unit of claim 5, wherein said internal volume is equal to at least about 120 percent of maximum volume of said collector frame during use of said fabric collector bag.

9. The collector unit of claim 5, wherein said internal volume is equal to about 125 percent of said maximum volume of said collector frame during use of said fabric collector bag.

10. The collector unit of claim 5, wherein said fabric collector bag and said collector frame have a substantially isosceles trapezoidal cross sectional shape.

11. The collector unit of claim 5, wherein said fabric collector bag and said collector frame have a substantially rectangular cross sectional shape.

12. The collector unit of claim 5, further comprising a vent screen releasably secured to said fabric collector bag.

13. A collector unit comprising:
   a collector frame having a maximum volume; and
   a fabric collector bag secured to said collector frame by a plurality of sewn loops at an outer periphery of said collector frame and a corresponding plurality of gathers of fabric at an inner circumference of said collector frame,
   wherein each of said plurality of sewn loops are secured to each of said plurality of gathers so that an internal volume of said fabric collector bag is equal to at least about 115 percent of said maximum volume of said collector frame during use of said fabric collector bag.

14. The collector unit of claim 13, wherein each of said plurality of gathers of fabric have a length that is at least equal to a length of each of said plurality of sewn loops.

15. The collector unit of claim 13, wherein said fabric collector bag and said collector frame have a substantially isosceles trapezoidal cross sectional shape.

16. The collector unit of claim 13, wherein said fabric collector bag and said collector frame have a substantially rectangular cross sectional shape.

17. The collector unit of claim 13, further comprising a vent screen releasably secured to said fabric collector bag.

18. The collector unit of claim 13, wherein said internal volume is equal to at least about 120 percent of said maximum volume of said collector frame during use of said fabric collector bag.

19. The collector unit of claim 13, wherein said internal volume is equal to about 125 percent of said maximum volume of said collector frame during use of said fabric collector bag.

* * * * *